(12) United States Patent
Choi

(10) Patent No.: US 11,636,007 B2
(45) Date of Patent: Apr. 25, 2023

(54) MEMORY SYSTEM AND OPERATING METHOD THEREOF FOR FLUSHING DATA IN DATA CACHE WITH PARITY

(71) Applicant: SK hynix Inc., Icheon-si (KR)

(72) Inventor: Min Kyung Choi, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 17/301,452

(22) Filed: Apr. 2, 2021

(65) Prior Publication Data

US 2022/0156141 A1    May 19, 2022

(30) Foreign Application Priority Data

Nov. 17, 2020  (KR) .................. 10-2020-0153351

(51) Int. Cl.
*G06F 11/10* (2006.01)
*G06F 11/00* (2006.01)
*G06F 12/08* (2016.01)
*G06F 12/00* (2006.01)
*G06F 12/0804* (2016.01)

(52) U.S. Cl.
CPC ...... *G06F 11/1004* (2013.01); *G06F 12/0804* (2013.01); *G06F 2212/1032* (2013.01)

(58) Field of Classification Search
CPC ............. G06F 11/1004; G06F 12/0804; G06F 2212/1032
See application file for complete search history.

(56) References Cited

U.S. PATENT DOCUMENTS

| 2018/0232277 | A1* | 8/2018 | Nelogal | ............... G06F 12/0804 |
| 2019/0026033 | A1* | 1/2019 | Simionescu | ........ G06F 12/0868 |
| 2021/0311653 | A1* | 10/2021 | Wang | .................... G06F 3/0685 |

FOREIGN PATENT DOCUMENTS

| KR | 10-2007-0046835 | 5/2007 |
| KR | 10-2012-0113853 | 10/2012 |

* cited by examiner

*Primary Examiner* — Justin R Knapp
(74) *Attorney, Agent, or Firm* — Weaver Austin Villeneuve & Sampson LLP

(57) ABSTRACT

Embodiments of the present disclosure relate to a memory system and an operating method thereof. A memory system may include a memory device and a memory controller configured to, when receiving from the host a flush command instructing to flush data cached in a data cache to the memory device, flush first data cached in the data cache, the first data having a size smaller than a size of the reference write unit, to the memory device, write a first parity associated with the first data to a parity memory block, update a value of a parity location pointer indicating a location where the first parity is written, and set a parity write flag indicating whether the parity at the location pointed by the parity location pointer is valid.

20 Claims, 15 Drawing Sheets

MEMORY SYSTEM AND OPERATING METHOD THEREOF FOR FLUSHING DATA IN DATA CACHE WITH PARITY

CROSS-REFERENCE TO RELATED APPLICATION

The present application claims priority under 35 U.S.C. 119(a) to Korean patent application number 10-2020-0153351 filed on Nov. 17, 2020, which is incorporated herein by reference in its entirety.

BACKGROUND

1. Technical Field

Embodiments of the present disclosure relate to a memory system and an operating method thereof.

2. Related Art

A memory system includes a data storage device that stores data on the basis of a request from a host, such as a computer, servers, a smartphone, a tablet PC, or other electronic devices. Examples of the memory system span from a traditional magnetic-disk-based hard disk drive (HDD) to a semiconductor-based data storage device such as a solid state drive (SSD), a universal flash storage device (UFS), or an embedded MMC (eMMC) device.

The memory system may further include a memory controller for controlling a memory device. The memory controller may receive a command from the host and, on the basis of the received command, may execute the command or control read/write/erase operations on the memory devices in the memory system. The memory controller may be used to execute firmware operations for performing a logical operation for controlling such operations.

When the memory system writes data to the memory device, the memory system may write a parity corresponding to the data to be written to the memory device along with the data in order to verify whether the written data has no errors.

SUMMARY

Embodiments of the disclosure may provide a memory system including a memory device and an operating method thereof that are capable of preventing performance degradation caused by writing unnecessary dummy data together when writing data and a parity associated with the data to the memory device.

In one aspect, embodiments of the disclosure may provide a memory system including a memory device having a plurality of memory blocks, and a memory controller for communicating with the memory device and controlling the memory device.

In one embodiment, the memory controller may be configured to, when receiving a flush command from a host instructing the memory device to flush data cached in a data cache to the memory device, the data cache is configured to cache data to be written to the memory device, flush first data to the memory device, the first data being cached in the data cache and having a size smaller than a size of a reference write unit which is a reference for writing data to the memory device together with a parity.

The memory controller may write a first parity associated with the first data to a parity memory block storing parity for data having a size smaller than the size of the reference write unit among the plurality of memory blocks.

The memory controller may update a value of a parity location pointer indicating a location of a parity most recently written to the memory device among a plurality of parities associated with data having a size smaller than the size of the reference write unit to a location where the first parity is written.

The memory controller may set a parity write flag indicating whether the parity indicated or pointed by the parity location pointer is valid.

In another aspect, embodiments of the disclosure may provide a method of operating a memory system including a memory device having a plurality of memory blocks.

The method of operating the memory system may include receiving a flush command from a host instructing the memory device to flush data cached in a data cache to the memory device, the data cache is for caching data to be written to the memory device.

The method of operating the memory system may include flushing first data to the memory device, the first data being cached in the data cache and having a size smaller than the size of a reference write unit which is a reference for writing data to the memory device together with a parity.

The method of operating the memory system may also include writing a first parity associated with the first data to a parity memory block which is configured to store parity for data smaller than the size of the reference write unit among the plurality of memory blocks.

The method of operating the memory system may further include updating a value of a parity location pointer indicating a location of a parity most recently written to the memory device among a plurality of parities associated with data smaller than the size of the reference write unit to a location where the first parity is written.

The method of operating the memory system may also include setting a parity write flag indicating whether the parity indicated by the parity location pointer is valid.

In another aspect, embodiments of the disclosure may provide a memory system including a memory device including a plurality of memory blocks and a memory controller for communicating with the memory device and controlling the memory device.

The memory controller may write first data to a location of the memory device.

The memory controller may write second data successively to the location where the first data has been written.

The memory controller may calculate a first parity associated with the first data.

The memory controller may determine a value of a parity location pointer indicating a location where the first parity has been written.

The memory controller may set a parity write flag.

Embodiments of the disclosure provide memory systems and methods capable of effectively preventing performance degradation caused by writing unnecessary dummy data together when writing data and parity for data to the memory device.

DETAILED DESCRIPTION

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Figure 1:
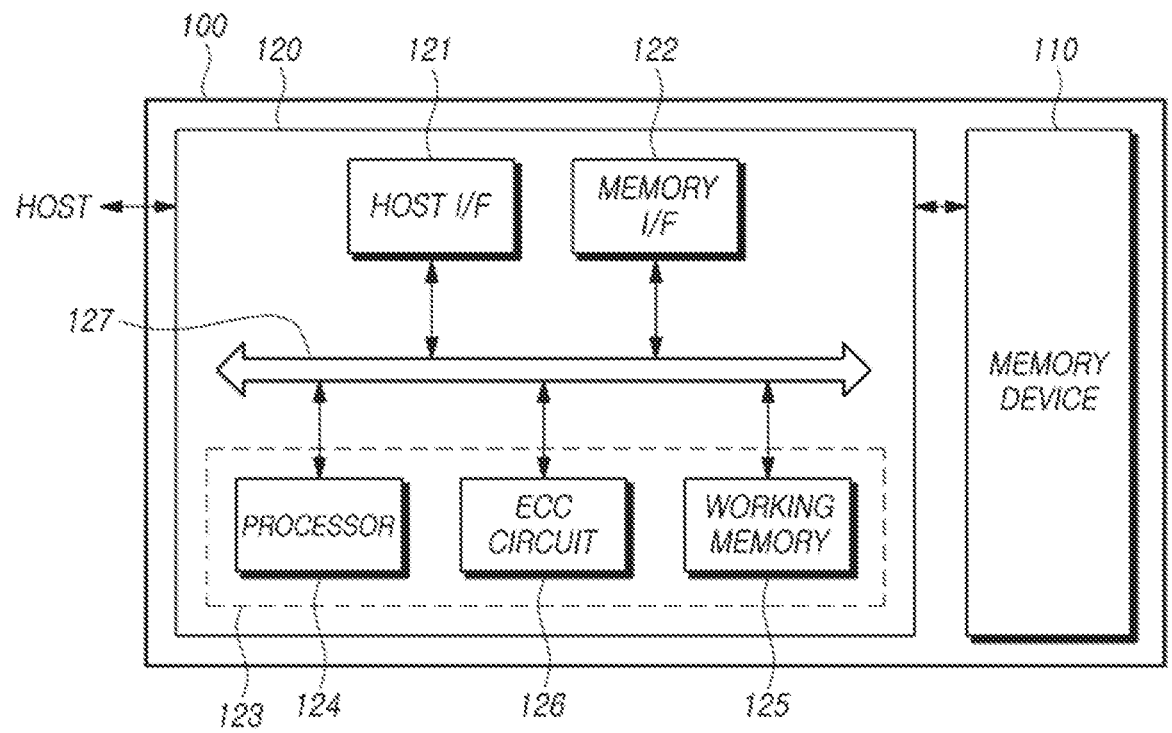
FIG. 1 is a schematic diagram illustrating a configuration of a memory system according to an embodiment of the disclosed technology.

FIG. 1 is a diagram schematically illustrating the configuration of a memory system 100 based on an embodiment of the disclosed technology.

In some implementations, the memory system 100 may include a memory device 110 configured to store data, and a memory controller 120 configured to control the memory device 110.

The memory device 110 may include multiple memory blocks each including a plurality of memory cells for storing data. The memory device 110 may be configured to operate in response to control signals received from the memory controller 120. Operations of the memory device 110 may include, for example, a read operation, a program operation (also referred to as a "write operation"), an erasure operation, and the like.

The memory cells in the memory device 110 are used to store data and may be arranged in a memory cell array. The memory cell array may be divided into memory blocks of memory cells and each block includes different pages of memory cells. In typical implementations of NAND flash memory devices, a page of memory cells is the smallest memory unit that can be programmed or written, and the data stored in memory cells can be erased at the block level.

In some implementations, the memory device 110 may be implemented as various types, such as a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Some embodiments of the disclosed technology are applicable to any type of flash memory devices having an electric charge storage layer. In an implementation, the electric charge storage layer may be formed of a conductive material, such an electric charge storage layer can be referred to as a floating gate. In another implementation, the electric charge storage layer may be formed of an insulating material, such a flash memory device can be referred to as a charge trap flash (CTF).

The memory device 110 may be configured to receive a command and an address from the memory controller 120 to access an area of the memory cell array selected using the address. That is, the memory device 110 may perform an operation corresponding to the received command on a memory area of the memory device having a physical address corresponding to the received address from the memory controller 120.

In some implementations, the memory device 110 may perform a program operation, a read operation, an erasure operation, and the like. During a program operation, the memory device 110 may write data in an area selected by an address. During a read operation, the memory device 110 may read data from a memory area selected by an address. During an erasure operation, the memory device 110 may erase data stored in a memory area selected by an address.

The memory controller 120 may control write (program), read, erasure, and background operations that are performed on the memory device 110. The background operation may include, for example, operations that are implemented to optimize the overall performance of the memory device 110, such as a garbage collection (GC) operation, a wear leveling (WL) operation, and a bad block management (BBM) operation.

The memory controller 120 may control the operation of the memory device 110 at the request of a host. Alternatively, the memory controller 120 may control the operation of the memory device 110 even in the absence of request from the host when it performs background operations of the memory device.

The memory controller 120 and the host may be separate devices. In some implementations, the memory controller 120 and the host may be integrated and implemented as a single device. In the following description, the memory controller 120 and the host will be discussed as separate devices as a not limiting example.

Referring to FIG. 1, the memory controller 120 may include a memory interface 122, a control circuit 123, and a host interface 121.

The host interface 121 may be configured to provide an interface for communication with the host.

When receiving a command from the host HOST, the control circuit 123 may receive the command through the host interface 121 and may perform an operation in response to the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations in the memory device 110 based on control signals and instructions from the control circuit 123.

The control circuit 123 may be configured to control operations of the memory device 110 through the memory controller 120. For example, the control circuit 123 may include a processor 124 and a working memory 125. The control circuit 123 may further include an error detection/correction circuit (ECC circuit) 126 and the like configured to detect and correct one or more errors.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may be configured to perform operations associated with a flash translation layer (FTL) to effectively manage the memory operations in the memory system 100. The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on a mapping unit. Typical address mapping methods may include a page mapping method, a block mapping method, and a hybrid mapping method.

The processor 124 may be configured to randomize data received from the host to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) to control operations of the memory controller 120. In other words, the processor 124 may control the overall operation of the memory controller 120 and, in order to perform a logical operation, may execute (drive) firmware loaded into the working memory 125 during booting.

The term "firmware" refers to a program or software stored in a certain nonvolatile memory and is executed by the processor 124 inside the memory system 100.

In some implementations, the firmware may include various functional layers. For example, the firmware may include at least one of a flash translation layer (FTL) configured to translate a logical address in the host HOST requests to a physical address of the memory device 110, a host interface layer (HIL) configured to interpret a command that the host HOST issues to a data storage device such as the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data necessary to operate the memory controller 120. The working memory 125 may include, for example, at least one of a static RAM (SRAM), a dynamic RAM (DRAM), and a synchronous RAM (SDRAM) as a volatile memory.

The error detection/correction circuit 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. In the present disclosure, a sector may refer to a data unit that is smaller than the read unit (e.g., page) of a flash memory. Sectors constituting each piece of read data may be mapped based on addresses.

In some implementations, the error detection/correction circuit 126 may calculate a bit error rate (BER) and determine whether the number of erroneous bits in the data is within the error correction capability sector by sector. For example, if the BER is higher than a reference value, the error detection/correction circuit 126 may determine that the erroneous bits in the corresponding sector are uncorrectable and the corresponding sector is marked "fail." If the BER is lower than or equals to the reference value, the error detection/correction circuit 126 may determine that the corresponding sector is correctable or the corresponding sector can be marked "pass."

The error detection/correction circuit 126 may perform error detection and correction operations successively on all read data. When a sector included in the read data is correctable, the error detection/correction circuit 126 may move on to the next sector to check as to whether an error correction operation is needed on the next sector. Upon completion of the error detection and correction operations on all the read data in this manner, the error detection/correction circuit 126 may acquire information as to which sector is deemed uncorrectable in the read data. The error detection/correction circuit 126 may provide such information (e.g., address of uncorrectable bits) to the processor 124.

The memory system 100 may also include a bus 127 to provide a channel between the constituent elements 121, 122, 124, 125, and 126 of the memory controller 120. The bus 127 may include, for example, a control bus for delivering various types of control signals and commands, and a data bus for delivering various types of data.

By way of example, FIG. 1 illustrates the above-mentioned constituent elements 121, 122, 124, 125, and 126 of the memory controller 120. It is noted that some of those elements illustrated in the drawings may be omitted, or some of the above-mentioned constituent elements 121, 122, 124, 125, and 126 of the memory controller 120 may be integrated into a single element. In addition, in some implementations, one or more other constituent elements may be added to the above-mentioned constituent elements of the memory controller 120.

Figure 2:
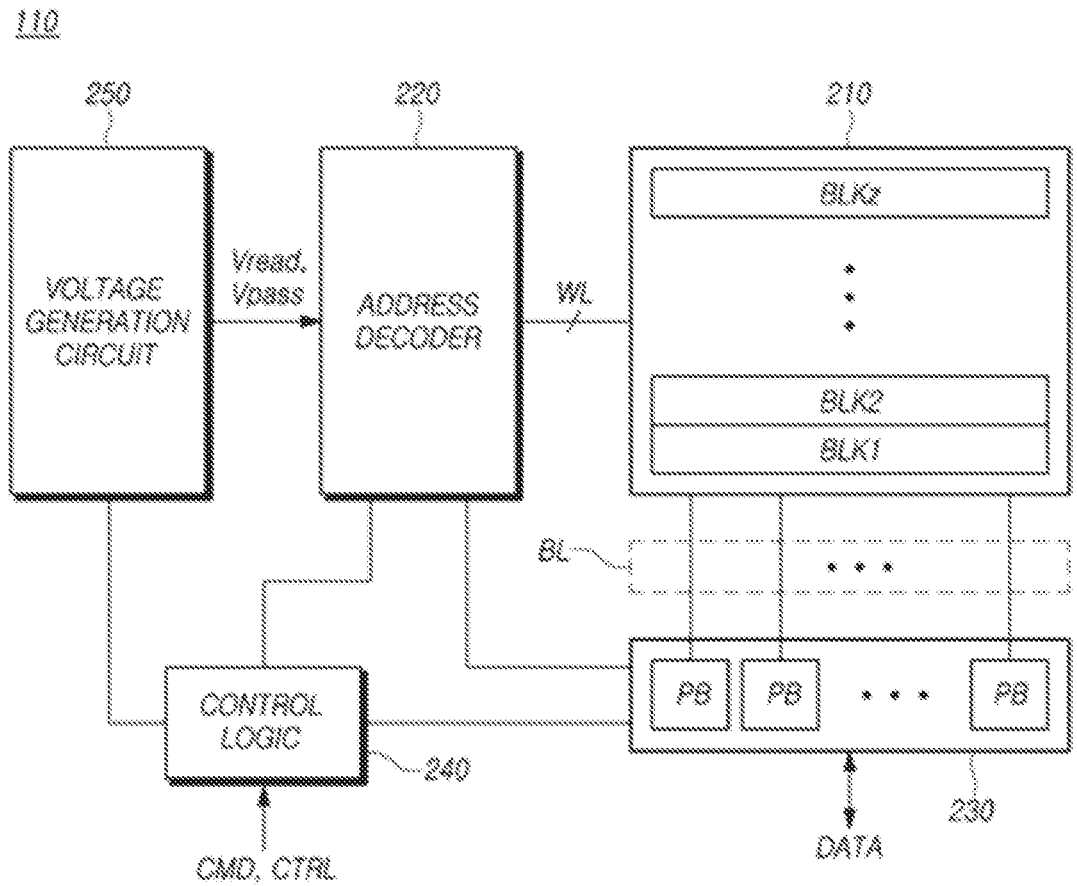
FIG. 2 is a block diagram schematically illustrating a memory device according to an embodiment of the disclosed technology.

FIG. 2 is a block diagram schematically illustrating a memory device 110 based on an embodiment of the disclosed technology.

In some implementations, the memory device 110 based on an embodiment of the disclosed technology may include a memory cell array 210, an address decoder 220, a read/write circuit 230, a control logic 240, and a voltage generation circuit 250.

The memory cell array 210 may include multiple memory blocks BLK1-BLKz, where z is a natural number equal to or larger than 2.

In the multiple memory blocks BLK1-BLKz, multiple word lines WL and multiple bit lines BL may be disposed in rows and columns, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells. In some implementations, such nonvolatile memory cells may be arranged in a vertical channel structure.

The memory cell array 210 may be configured as a memory cell array having a two-dimensional structure. In some implementations, the memory cell array 210 may be arranged in a three-dimensional structure.

Each of the multiple memory cells included in the memory cell array 210 may store at least one bit of data. For example, each of the multiple memory cells included in the memory cell array 210 may be a single-level cell (SLC) configured to store one bit of data. As another example, each of the multiple memory cells included in the memory cell array 210 may be a multi-level cell (MLC) configured to store two bits of data per memory cell. As another example, each of the multiple memory cells included in the memory cell array 210 may be a triple-level cell (TLC) configured to store three bits of data per memory cell. As yet another example, each of the multiple memory cells included in the memory cell array 210 may be a quad-level cell (QLC) configured to store four bits of data per memory cell. As still another example, the memory cell array 210 may include multiple memory cells, each of which may be configured to store at least five bits of data per memory cell.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to command and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 220 may, during a read operation, apply the read voltage Vread to a selected word line WL inside a selected memory block and apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that participates in a data processing function and, in some implementations, may further include a cache buffer for data caching.

The multiple page buffers PB may be connected to the memory cell array 210 through the multiple bit lines BL. In order to detect or sense the threshold voltage Vth of the memory cells during a read operation and a program verification operation, the multiple page buffers PB may continuously supply a sensing current to the bit lines BL connected to the memory cells to detect, at a sensing node, a change proportional to the amount of current that varies depending on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level of sensing nodes of multiple page buffers PB to a pre-charge voltage level.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

A memory block BLK disposed in the memory device 110 may include multiple pages PG. In some implementations, a plurality of memory cells arranged in columns form memory cell strings, and a plurality of memory cells arranged in rows form memory blocks. Each of the multiple pages PG is coupled to one of word lines WL, and each of the memory cell strings STR is coupled to one of bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. Alternatively, each of the multiple word lines WL may be arranged in the column direction, and each of the multiple bit lines BL may be arranged in the row direction.

In some implementations, the multiple word lines WL and the multiple bit lines BL may intersect with each other and electrically isolated from each other, thereby addressing a single memory cell in the array of multiple memory cells MC. In some implementations, each memory cell MC may include a transistor TR that includes a material layer that can hold an electrical charge.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some implementations, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed page by page, and an erasure operation may be performed memory block by memory block.

Figure 3:
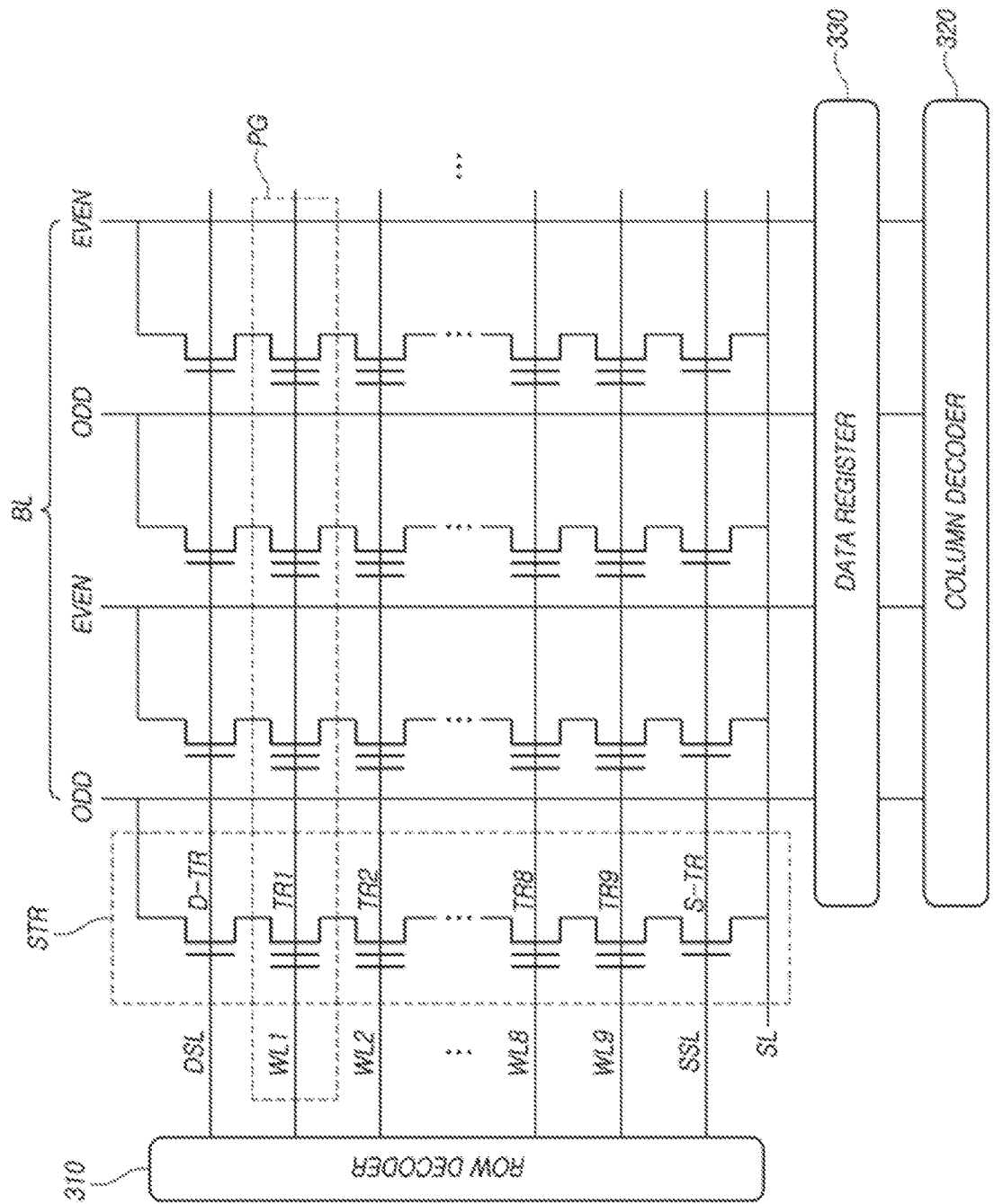
FIG. 3 is a diagram illustrating a structure of word lines and bit lines of a memory device according to an embodiment of the disclosed technology.

FIG. 3 is a diagram illustrating a structure of word lines WL and bit lines BL of a memory device 110 based on an embodiment of the disclosed technology.

Referring to FIG. 3, the memory device 110 has a core area in which memory cells MC are arranged, and an auxiliary area (the remaining area other than the core area) to include circuitry that is used to perform the operations of the memory cell array 210.

In the core area, a certain number of memory cells arranged in one direction can be called "page" PG, and a certain number of memory cells that are coupled in series can be called "memory cell string" STR.

The word lines WL1-WL9 may be connected to a row decoder 310. The bit lines BL may be connected to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (e.g., two or four) pages PG. Each page PG is the smallest unit in a program operation and a read operation, and all memory cells MC within the same page PG may perform simultaneous operations when conducting a program operation and a read operation.

The multiple bit lines BL may be connected to the column decoder 320. In some implementations, the multiple bit lines BL may be divided into odd-numbered bit lines BL and even-numbered bit lines BL such that a pair of odd-numbered bit line and even-numbered bit line is coupled in common to a column decoder 320.

In accessing a memory cell MC, the row decoder 310 and the column decoder 320 are used to locate a desired memory cell based on the address.

In some implementations, the data register 330 plays an important role because all data processing by the memory device 110, including program and read operations, occurs via the data register 330. If data processing by the data register 330 is delayed, all of the other areas need to wait until the data register 330 finishes the data processing, degrading the overall performance of the memory device 110.

Referring to the example illustrated in FIG. 3, in one memory cell string STR, multiple transistors TR1-TR9 may be connected to multiple word lines WL1-WL9, respectively. In some implementations, the multiple transistors TR1-TR9 correspond to memory cells MC. In this example, the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which closer to the data register 330 and has a shorter signal path compared to the other outermost word line WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR is used as a switch circuit that connects the corresponding memory cell string STR to the data register 330. The second selection transistor S-TR is used as a switch that connects the corresponding memory cell string STR to the source line SL. That is, the first selection transistor D-TR and the second selection transistor S-TR can be used to enable or disable the corresponding memory cell string STR.

In some implementations, the memory system 100 applies a predetermined turn-on voltage Vcc to the gate electrode of the first selection transistor D-TR, thereby turning on the first selection transistor D-TR, and applies a predetermined turn-off voltage (e.g., 0V) to the gate electrode of the second selection transistor S-TR, thereby turning off the second selection transistor S-TR.

The memory system 100 turns on both the first and second selection transistors D-TR and S-TR during a read operation or a verification operation. Accordingly, during a read operation or a verification operation, an electric current may flow through the corresponding memory cell string STR and drain to the source line SL, which corresponds to the ground, such that the voltage level of the bit line BL can be measured. However, during a read operation, there may be a time difference in the on/off timing between the first selection transistor D-TR and the second selection transistor S-TR The memory system 100 may apply a predetermined voltage (e.g., +20V) to the substrate through the source line SL during an erasure operation. The memory system 100 applies a certain voltage to allow both the first selection transistor D-TR and the second selection transistor S-TR to float during an erasure operation. As a result, the applied erasure voltage can remove electrical charges from the floating gates FG of the selected memory cells.

Figure 4:
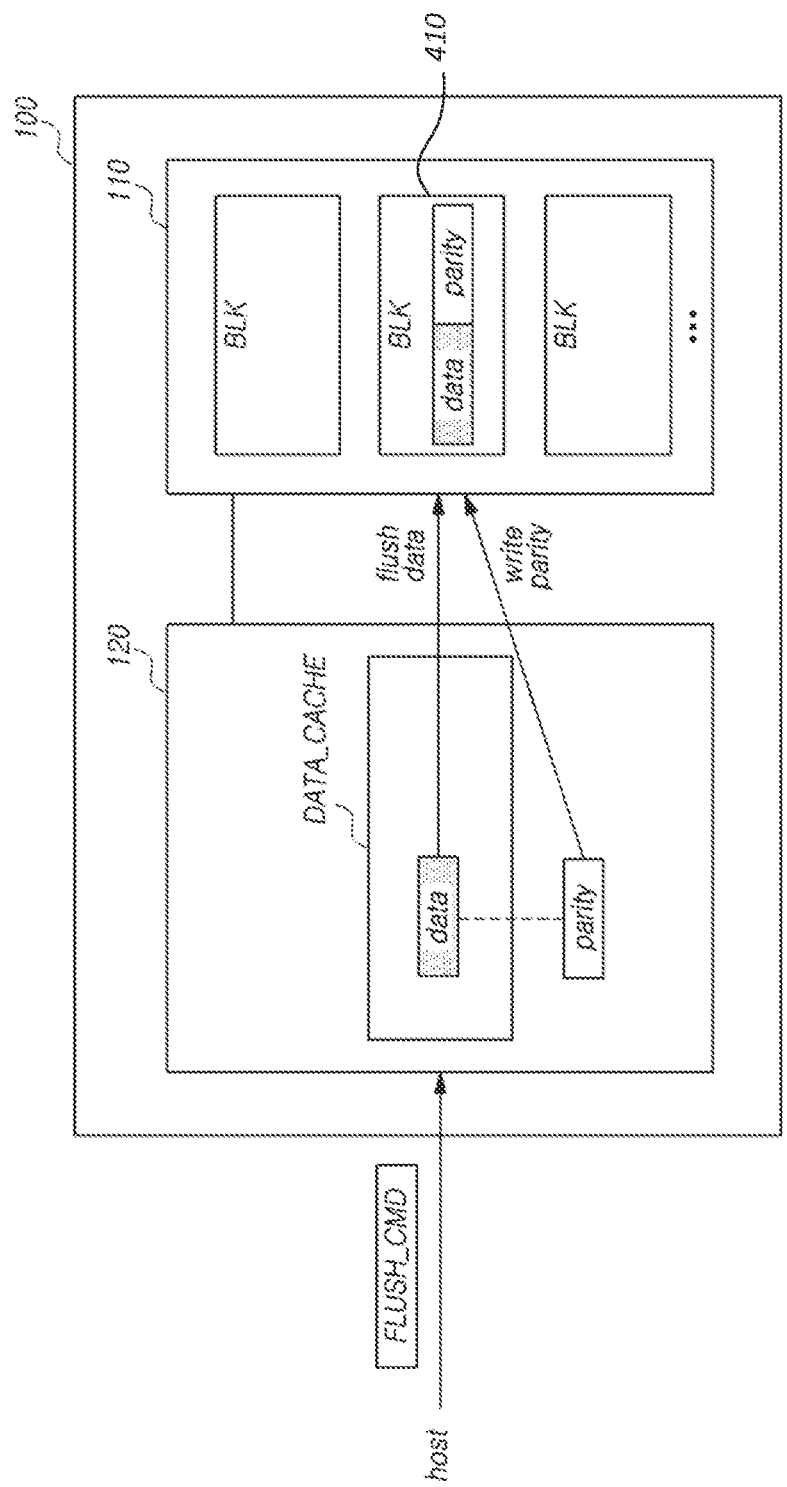
FIG. 4 is a diagram illustrating an operation of processing a flush command received from a host by a memory system according to embodiments of the present disclosure.

FIG. 4 is a diagram illustrating an operation of processing a flush command FLUSH_CMD received from a host by a memory system 100 including a memory device 100 and a memory controller 120 according to embodiments of the present disclosure.

The memory controller 120 of the memory system 100 may, when receiving data to be written to the memory device 110 from the host, cache the received data in the data cache DATA_CACHE. The data cache DATA_CACHE may be located in a volatile memory for storing data to be written to the memory device 110. For example, the data cache DATA_CACHE may be located on the working memory 125 described above with reference to FIG. 1.

The memory controller 120 of the memory system 100, when a specific condition is satisfied, may flush the data cached in the data cache DATA_CACHE to the memory device 110. The flushing of the data cache DATA_CACHE to the memory device 110 performed by the memory controller 120 may mean that the memory controller 120 writes the corresponding data to the memory device 110 and deletes the data from the data cache DATA_CACHE. In this case, the data cached in the data cache DATA_CACHE may be stored in any one of a plurality of memory blocks BLK disposed in the memory device 110 or distributed and stored in one or more memory blocks.

When receiving the flush command FLUSH_CMD from the host, the memory controller 120 may flush data cached in the data cache DATA_CACHE to the memory device 110. The flush command FLUSH_CMD may be a command instructing to flush data cached in the data cache DATA_CACHE to the memory device 110, irrespective of whether the condition in which the data cached in the data cache DATA_CACHE is flushed to the memory device 110 is satisfied.

When receiving the flush command FLUSH_CMD from the host, the memory controller 120 may write a parity associated with the data written to the memory device 110 while flushing data cached in the data cache DATA_CACHE. In this case, the memory controller 120 may generate parity corresponding to the data by performing a specific operation (e.g., XOR operation) on each bit of the data, for example. As another example, the memory controller 120 may generate parity corresponding to the data by inputting the data to a separate parity calculation circuit.

In FIG. 4, it has been described the case in which data and parity associated with the data are written to the same memory block BLK (e.g., memory block 410) in the memory device 110 as an example. However, the data and the parity corresponding to the data may be distributed and stored in the different memory block BLK in the memory device 110.

Hereinafter, it will be described in detail the example of an operation of writing data and parity associated with the data to the memory device 110 by the memory system 100.

Figure 5:
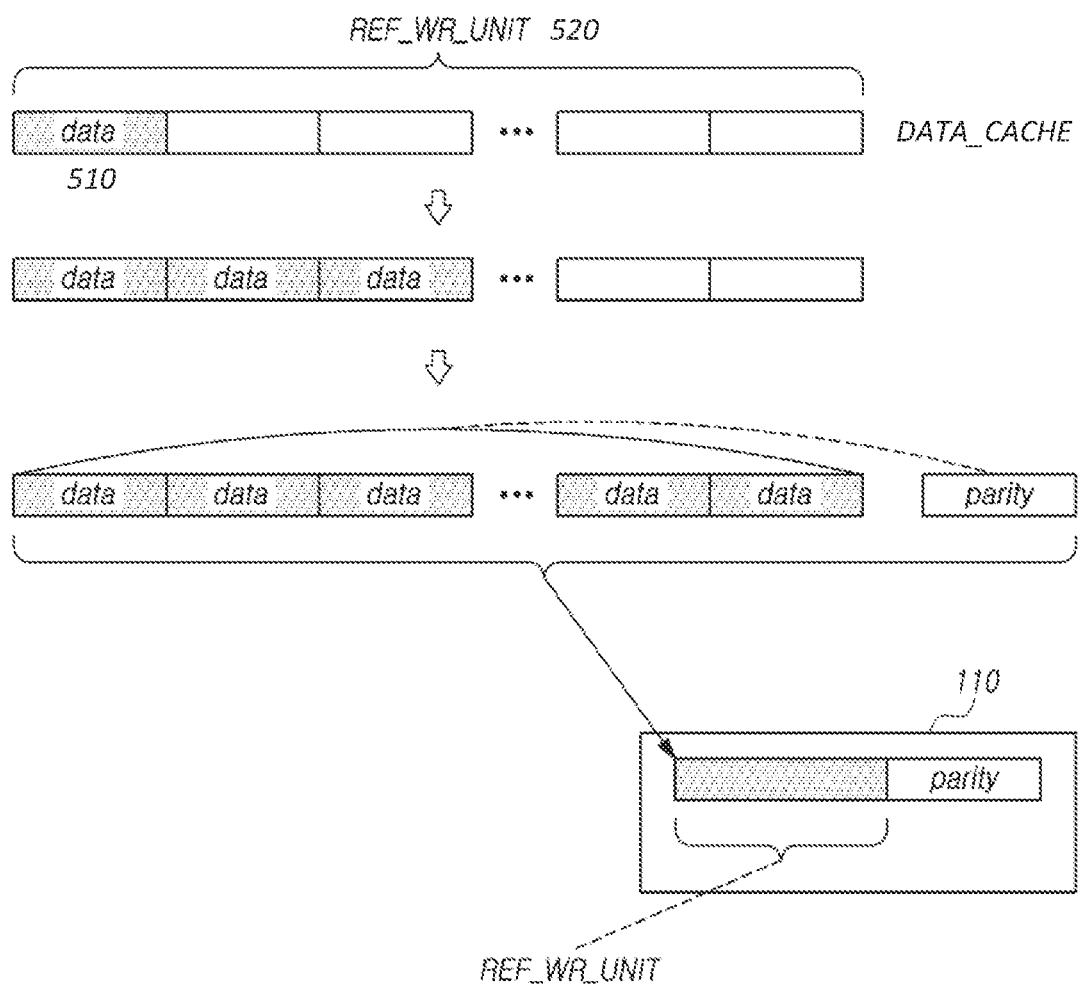
FIG. 5 is a diagram illustrating an example of an operation of writing data and parity to the memory device by a memory system according to embodiments of the present disclosure.

FIG. 5 is a diagram illustrating an example of an operation of writing data and parity to the memory device 110 by the memory system 100 according to embodiments of the present disclosure.

Referring to FIG. 5, the memory controller 120 of the memory system 100 may determine whether to write the data to the memory device 110 by comparing the size 510 of the data cached in the data cache DATA with the size 520 of a reference write unit REF_WR_UNIT.

The reference write unit REF_WR_UNIT may be a reference used by the memory controller 120 to write data cached in the data cache DATA_CACHE to the memory device 110 together with a parity associated with the data. For example, the reference write unit REF_WR_UNIT may be a stripe unit which is an unit in which data is written at a time in the word line WL, the memory device 110 or a super memory block that logically bundles at least one of the plurality of memory blocks BLK included in the memory device 110.

When the size 510 of data cached in the data cache DATA_CACHE is smaller than the size 520 of the reference write unit REF_WR_UNIT, the memory controller 120 may cache data to be written in the data cache DATA_CACHE.

In the case that the size 510 of the data cached in the data cache DATA_CACHE exceeds or is greater than the size 520 of the reference write unit REF_WR_UNIT, the memory controller 120 may write data with the size of a reference write unit REF_WR_UNIT and the parity associated with the corresponding data to the memory device 110 together. For example, data and parity may be successively or continuously written in the memory device 110. In this case, the successive writing of data and parity may not mean that data and parity are written to a physically adjacent area, but that data and parity are written to a logically adjacent address within the reference write unit REF_WR_UNIT.

Figure 6:
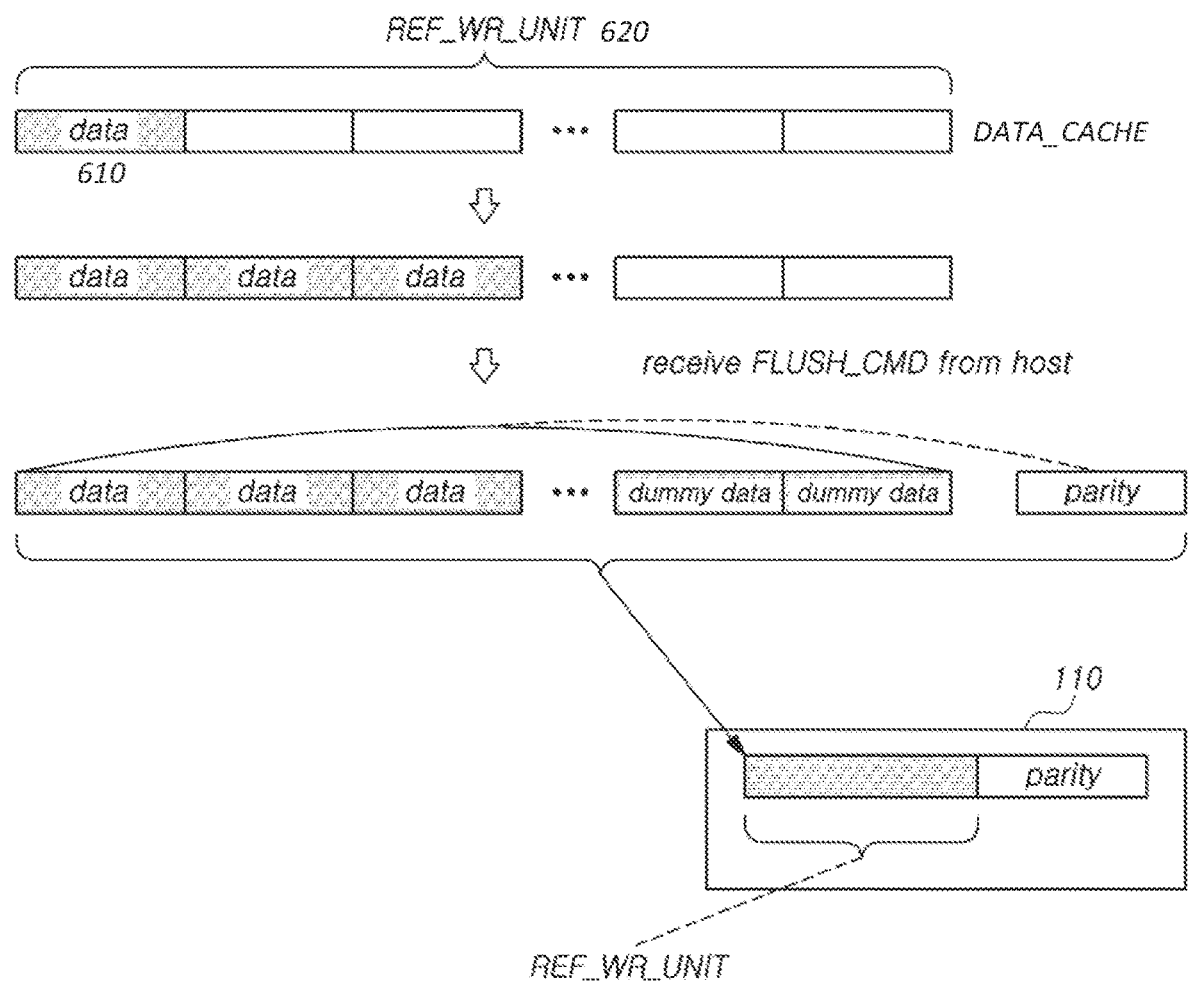
FIG. 6 is a diagram illustrating another example of an operation of writing data and parity to a memory device by a memory system according to embodiments of the present disclosure.

FIG. 6 is a diagram illustrating another example of an operation of writing data and parity to the memory device 110 by the memory system 100 according to embodiments of the present disclosure.

Referring to FIG. 6, when the size 610 of the data cached in the data cache DATA_CACHE is smaller than the size 620 of the reference write unit REF_WR_UNIT, the memory controller 120 of the memory system 100 may continue to cache the data to be written in the data cache DATA_CACHE.

In this case, the memory controller 120 may receive the flush command FLUSH_CMD from the host while the size of the data cached in the data cache DATA_CACHE is smaller than the size of the reference write unit REF_WR_UNIT.

Since the flush command FLUSH_CMD has been received from the host, the memory controller 120 will flush the data cached in the data cache DATA_CACHE to the memory device 110. However, at that time, the size of the data cached in the data cache DATA_CACHE is smaller than the size of the reference write unit REF_WR_UNIT.

Therefore, the memory controller 120 may write dummy data successively to data cached in the data cache DATA_CACHE. In this case, the sum of the size of data cached in the data cache DATA_CACHE and the size of dummy data may become the size of the reference write unit REF_WR_UNIT.

Further, the memory controller 120 may calculate parity associated with the sum of data cached in the data cache DATA_CACHE and dummy data, and write the data cached in the data cache DATA_CACHE, dummy data and the parity together to the memory device 110. Therefore, the memory controller 120 may process the flush command FLUSH_CMD received from the host even when the size of the data cached in the data cache DATA_CACHE is smaller than the reference write unit REF_WR_UNIT.

However, the method of additionally writing dummy data as described above may have the following problems. Since dummy data which the host has not requested for writing is written to the memory device 110, there may be a problem in that the ratio (amount of data written to the memory device)/(amount of data requested to be written by the host) increases. In addition, the number of free memory blocks among the plurality of memory blocks BLK included in the memory device 110 may be reduced. As a result, the storage capacity of the memory device 110 may decrease, and the frequency of performing garbage collection (GC) for securing the free memory block may increase, thereby resulting in the problems of performance degradation of the memory system 100.

Hereinafter, embodiments of the present disclosure describe a novel operation of the memory system 100 capable of solving the above mentioned performance degradation problems.

Figure 7:
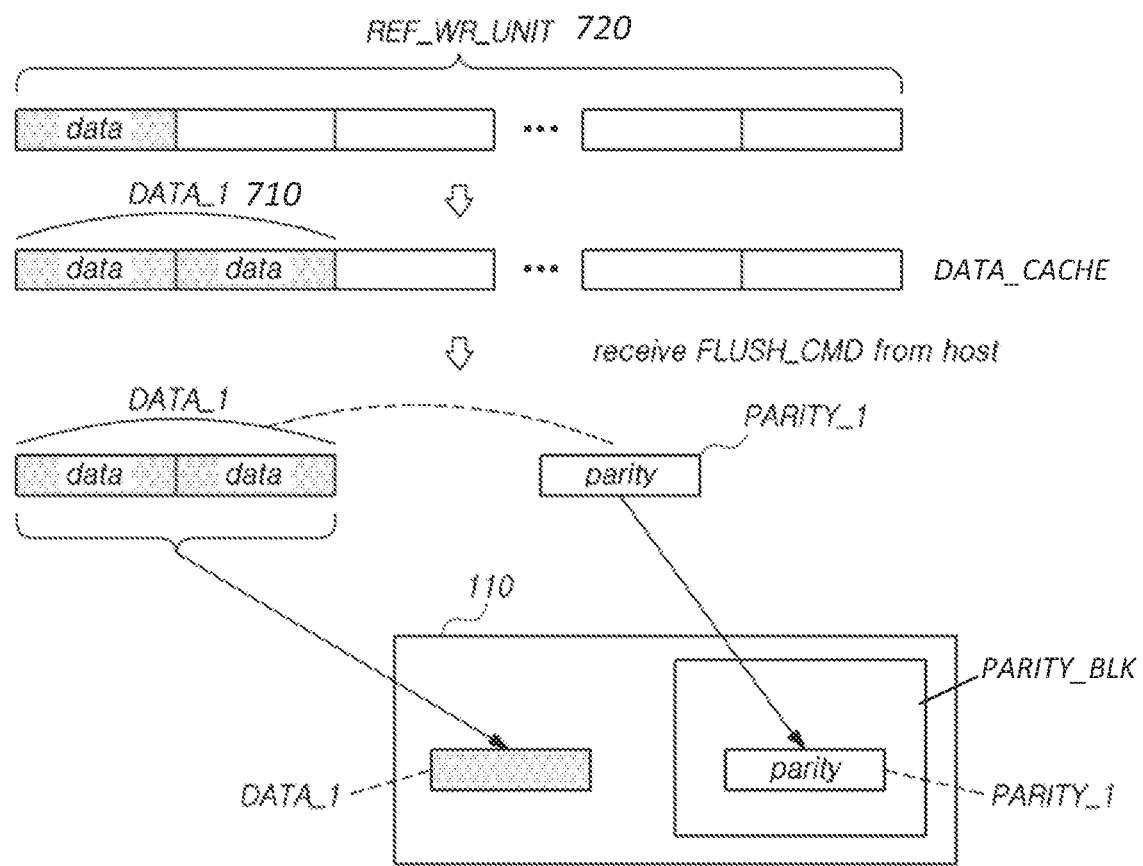
FIG. 7 is a diagram illustrating an example of an operation of writing first data and first parity to the memory device by a memory system according to embodiments of the present disclosure.

FIG. 7 is a diagram illustrating an example of an operation of writing first data DATA_1 and first parity PARITY_1 to the memory device 110 by the memory system 100 according to embodiments of the present disclosure.

Referring to FIG. 7, the memory controller 120 of the memory system 100 may receive the flush command FLUSH_CMD from the host while the first data DATA_1 is cached in the data cache DATA_CACHE. In this case, the size 710 of the first data DATA_1 is smaller than the size 720 of the reference write unit REF_WR_UNIT. In addition, the size 710 of the first data DATA_1 may be variable.

In this case, the memory controller 120 may flush the first data DATA_1 to the memory device 110 without adding dummy data, and may write the first parity PARITY_1, which is a parity for the first data DATA_1, to the parity memory block PARITY_BLK among the plurality of memory blocks BLK included in the memory device 110. The parity memory block PARITY_BLK is a memory block that stores parities for data having a size smaller than the size of the reference write unit REF_WR_UNIT among the plurality of memory blocks BLK included in the memory device 110. Meanwhile, even after writing the first parity PARITY_1 to the parity memory block PARITY_BLK, the memory controller 120 may store the first parity PARITY_1 therein without deleting the first parity PARITY_1.

Therefore, the memory controller 120 may process the flush command FLUSH_CMD received from the host without additionally writing dummy data to the memory device 110, thereby solving the performance degradation problems caused by writing dummy data.

In this case, the memory controller 120 is configured to manage the first data DATA_1 and the first parity PARITY_1 for combining the first data DATA_1 written to the memory device 110 and data to be additionally written and writing again to the memory device 110 with the reference write unit REF_WR_UNIT.

Hereinafter, it will be described the parity location pointer PARITY_LOC_PTR and the parity write flag PARITY_WR_FLG which is information used to manage the first data DATA_1 and the first parity PARITY_1 in embodiments of the present disclosure.

Figure 8:
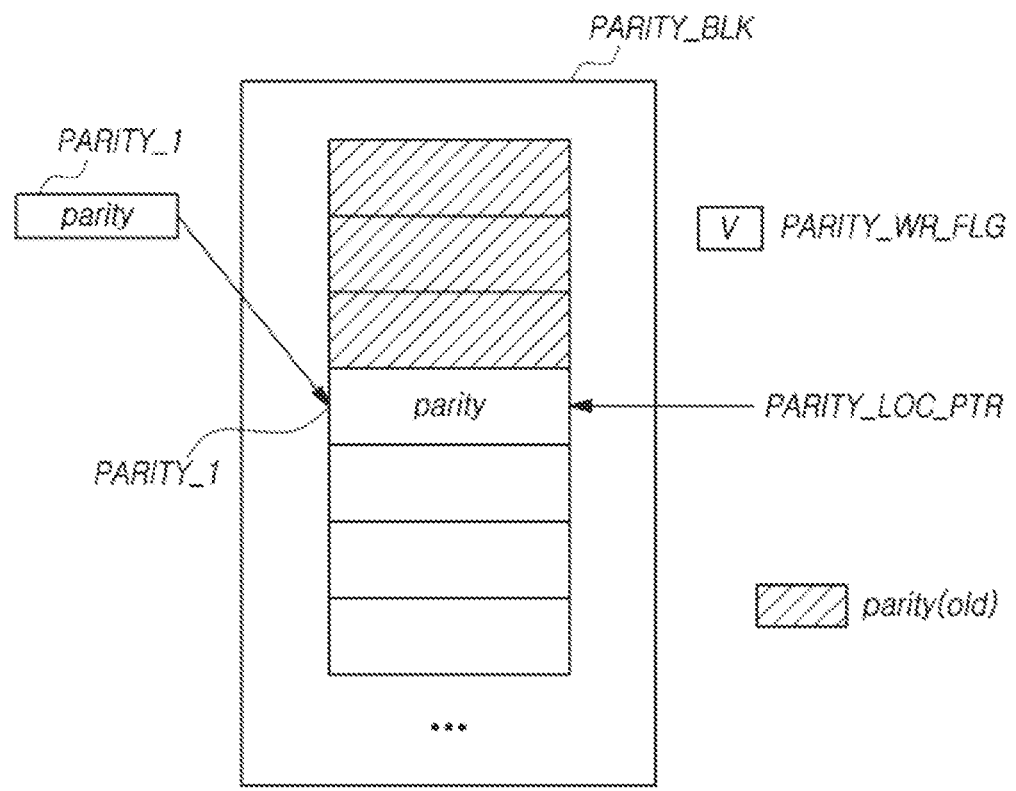
FIG. 8 is a diagram illustrating an example of a parity location pointer and a parity write flag according to embodiments of the present disclosure.

FIG. 8 is a diagram illustrating an example of a parity location pointer PARITY_LOC_PTR and a parity write flag PARITY_WR_FLG according to embodiments of the present disclosure.

Referring to FIG. 8, the memory controller 120 may update the value of the parity location pointer PARITY_LOC_PTR to a location where the first parity PARITY_1 is stored.

The parity location pointer PARITY_LOC_PTR is a value indicating the location of the parity most recently written to the memory device 110 among a plurality of parities associated with a plurality of respective data having the size smaller than the size of the reference write unit REF_WR_UNIT.

In the embodiments of the present disclosure, since the parity for data having the size of a reference write unit REF_WR_UNIT may be written together with the data, the memory system 100 may not be required to indicate the location separately. However, since a parity associated with data having a size smaller than the size of the reference write unit REF_WR_UNIT is written to a separate parity memory block PARITY_BLK, a pointer indicating the location where the parity is written may be required.

The memory controller 120 may, before writing the first parity PARITY_1 to the parity memory block PARITY_BLK, check the location where the first parity PARITY_1 is to be written by using the value of the existing parity location pointer PARITY_LOC_PTR. In addition, the memory controller 120 may write the first parity PARITY_1 successively or sequentialy to the location indicated by the existing parity location pointer PARITY_LOC_PTR, and may update the value of the parity location pointer PARITY_LOC_PTR to the location where the first parity PARITY_1 has been written.

Furthermore, the memory controller 120 may set the parity write flag PARITY_WR_FLG, which is a flag indicating whether a parity at a location indicated (pointed or identified) by the parity location pointer PARITY_LOC_PTR is valid.

In the case that the parity write flag PARITY_WR_FLG is set, the parity write flag PARITY_WR_FLG may indicate that the parity at the location indicated by the parity location pointer PARITY_LOC_PTR is valid. On the other hand, if the parity write flag PARITY_WR_FLG is reset, the parity write flag PARITY_WR_FLG may indicate that the parity at the location indicated by the parity location pointer PARITY_LOC_PTR is invalid.

The memory controller 120 may set the parity write flag PARITY_WR_FLG by setting the value of the parity write flag PARITY_WR_FLG to the first value (e.g., 1). In addition, the memory controller 120 may reset the parity write flag PARITY_WR_FLG by setting the value of the parity write flag PARITY_WR_FLG to a second value (e.g., 0) different from the first value.

Meanwhile, the location of the parity location pointer PARITY_LOC_PTR and the parity write flag PARITY_WR_FLG may vary according to implementation.

In an exemplary embodiment, the parity location pointer PARITY_LOC_PTR and the parity write flag PARITY_WR_FLG may be included in metadata for managing data stored in the memory device 110.

In another exemplary embodiment, the parity location pointer PARITY_LOC_PTR and the parity write flag PARITY_WR_FLG may be stored in a separate memory block allocated for storing the parity location pointer PARITY_LOC_PTR and the parity write flag PARITY_WR_FLG among the plurality of memory blocks BLK included in the memory device 110.

The above exemplary embodiments have described the operation of the memory system 100 for writing the first data DATA_1 to the memory device 110.

Hereinafter, embodiments of the present disclosure will describe the operation of the memory system 100 for additionally writing the second data DATA_2, immediately after writing the first data DATA_1 to the memory device 110.

Figure 9:
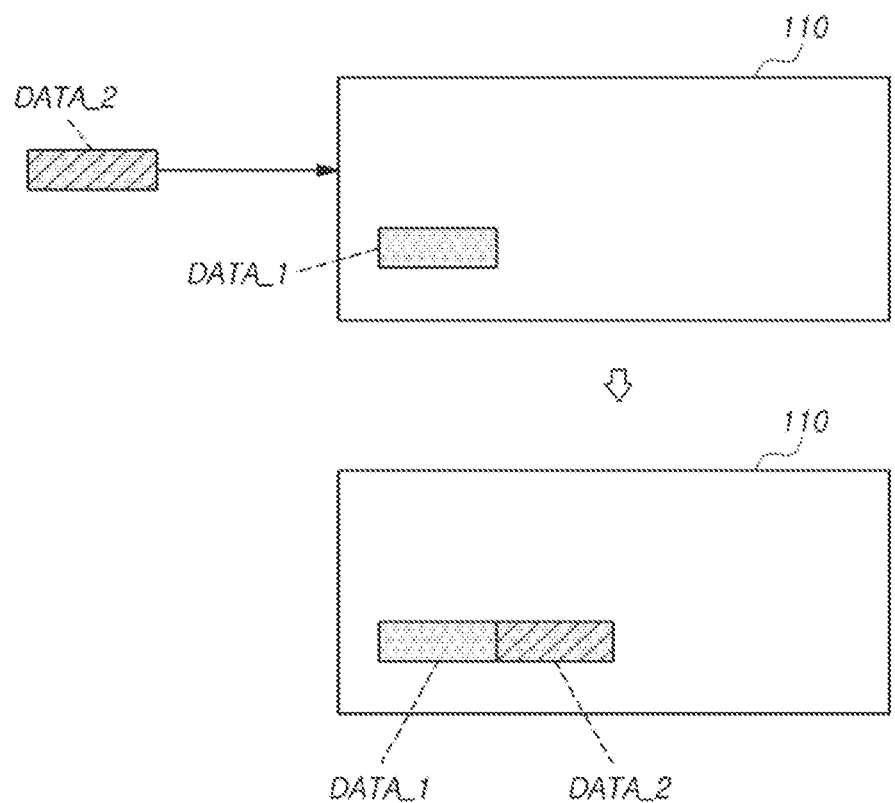
FIG. 9 is a diagram illustrating an example of an operation of additionally writing second data after first data is written by a memory system according to embodiments of the present disclosure.

FIG. 9 is a diagram illustrating an example of an operation of additionally writing second data DATA_2 after first data DATA_1 is written by the memory system 100 according to embodiments of the present disclosure.

Referring to FIG. 9, when writing the second data DATA_2 after the first data DATA_1 is written in the memory device 110, the memory controller 120 of the memory system 100 may write the second data DATA_2 successively or sequentially to the location where the first data DATA_1 is written in the memory device 110. In this case, the size of the second data DATA_2 may be changed during runtime.

Figure 10:
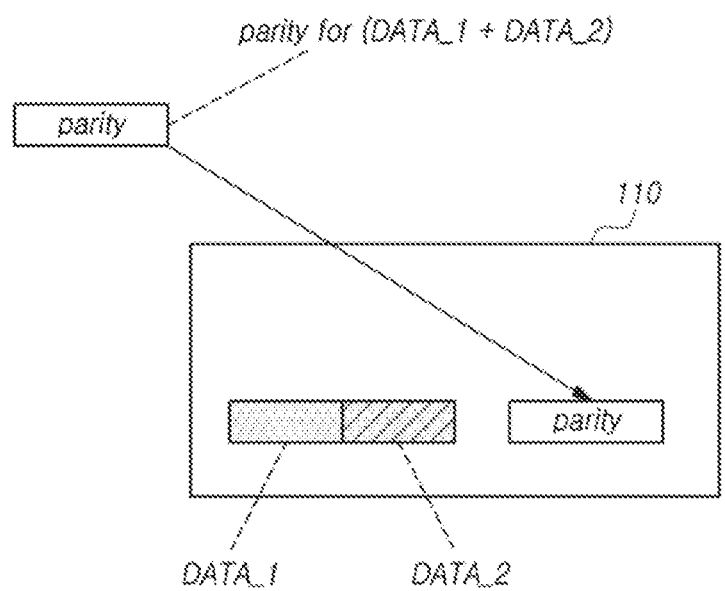
FIG. 10 is a diagram illustrating an example of an operation of writing a parity associated with a sum of first data and second data according to embodiments of the present disclosure.

FIG. 10 is a diagram illustrating an example of an operation of the memory system 100 for writing a parity associated with a sum of the first data DATA_1 and second data DATA_2 according to embodiments of the present disclosure.

Referring to FIG. 10, the memory controller 120 of the memory system 100 may write the parity associated with the sum of the first data DATA_1 and the second data DATA_2 to the memory device 110.

In this case, a specific operation of the memory controller 120 for writing the parity associated with the sum of the first data DATA_1 and the second data DATA_2 may vary depending on the sum of the size of the first data DATA_1 and the size of the second data DATA_2. Hereinafter, the parity writing operations according to embodiments of the present disclosure will be described in detail with reference to FIGS. 11 and 12.

Figure 11:
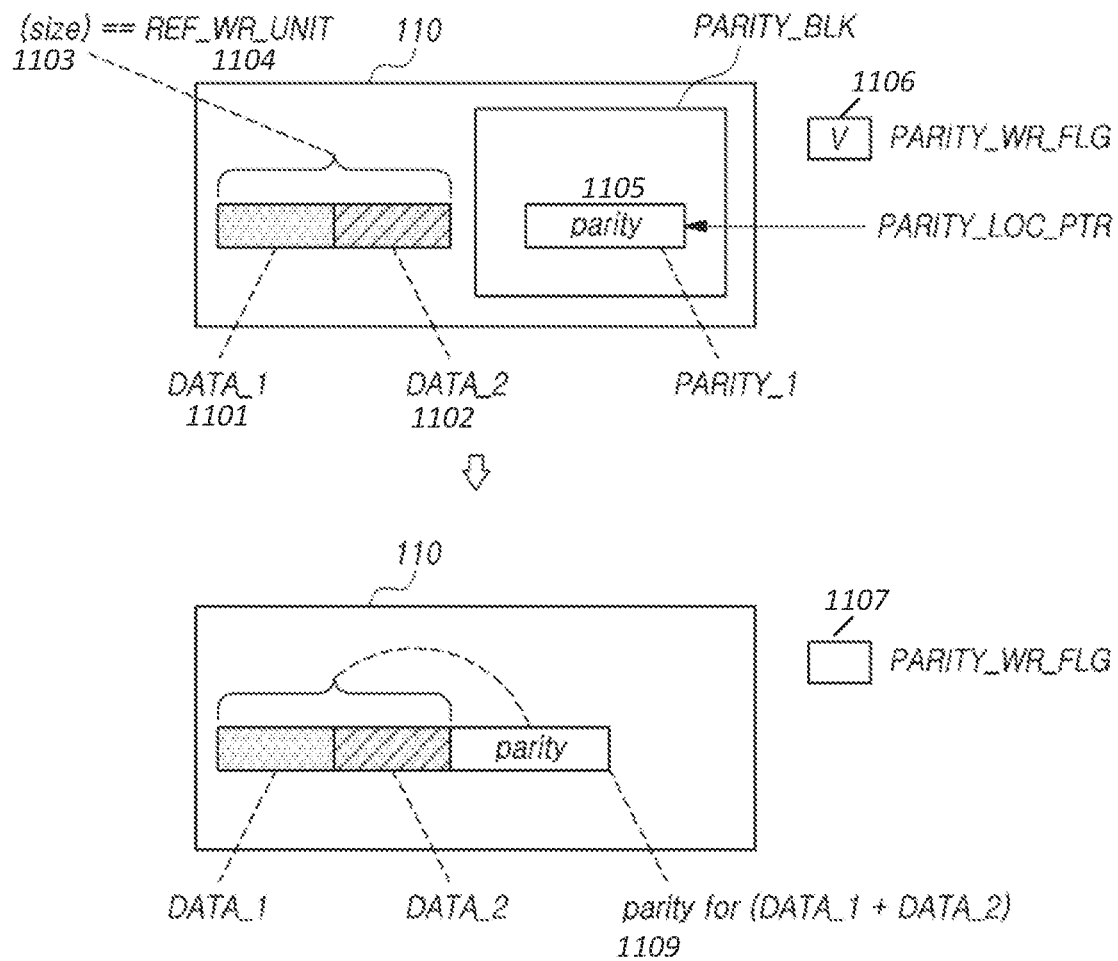
FIG. 11 is a diagram illustrating an example of an operation of writing parity associated with a sum of first data and second data according to embodiments of the present disclosure.
Figure 12:
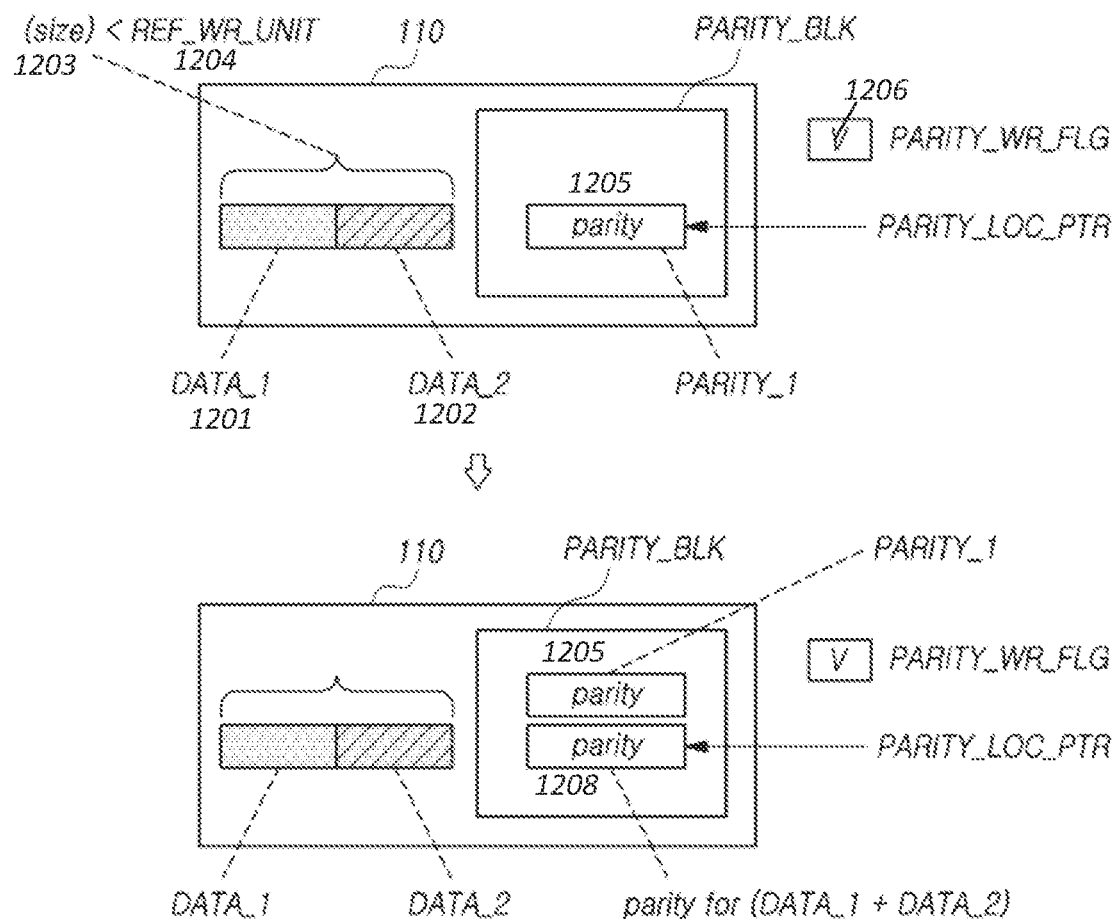
FIG. 12 is a diagram illustrating another example of an operation of writing parity associated with a sum of first data and second data according to embodiments of the present disclosure.

Referring to FIGS. 11 and 12, the parity write flag PARITY_WR_FLG is illustrated separately from the memory device 110 to indicate whether the parity write flag PARITY_WR_FLG is changed, but it is understood that this is not limited to the case in which the parity write flag PARITY_WR_FLG exists outside the memory device 110.

Furthermore, in FIGS. 11 and 12, the 'V' mark on the parity write flag PARITY_WR_FLG denotes that the parity write flag PARITY_WR_FLG has been set, and no 'V' mark on the parity write flag PARITY_WR_FLG denotes that the parity write flag PARITY_WR_FLG has been reset.

FIG. 11 is a diagram illustrating an example of an operation of the memory system 100 for writing parity for a sum of first data DATA_1 and second data DATA_2 according to embodiments of the present disclosure.

In FIG. 11, a sum 1103 of a size 1101 of the first data DATA_1 and a size 1102 of the second data DATA_2 has a size 1103 that is equal to a size 1104 of the reference write unit REF_WR_UNIT. In addition, a parity location pointer PARITY_LOC_PTR indicates a location 1105 where a first parity PARITY_1 associated with the first data DATA_1 is written, and the parity write flag PARITY_WR_FLG is in a set state 1106, indicated by a V mark.

In this case, the memory controller 120 may reset the parity write flag PARITY_WR_FLG (the parity write flag PARITY_WR_FLG is changed to a reset state 1107 indicated by the "unmarked" box) and write the parity of the sum of the first data DATA_1 and the second data DATA_2 successively to the second data DATA_2. The reason for the memory controller 120 to reset the parity write flag PARITY_WR_FLG is that the parity 1109 of the sum of the first data DATA_1 and the second data DATA_2 has been written to the memory device 110, so that the memory controller 120 is not required to manage the first parity PARITY_1.

Meanwhile, the memory controller 120 may maintain the parity location pointer PARITY_LOC_PTR without changing the value. Thereafter, when a new parity is written to the parity memory block PARITY_BLK, the location for the new parity to be written may be determined based on the value of the parity location pointer PARITY_LOC_PTR.

FIG. 12 is a diagram illustrating another example of the operation of writing a parity for a sum of first data DATA_1 and second data DATA_2 according to embodiments of the present disclosure.

Referring to FIG. 12, a sum 1203 of a size 1201 of the first data DATA_1 and a size 1202 of the second data DATA_2 is smaller than a size 1204 of a reference write unit REF_WR_UNIT.

In this case, the memory controller 120 may reset the parity write flag PARITY_WR_FLG, and write a parity for (associated with) the sum of the first data DATA_1 and the second data DATA_2 to the parity memory block PARITY_BLK at a location 1205. This is because the sum 1203 of the size 1202 of the first data DATA_1 and the size 1202 of the second data DATA_2 is smaller than the size 1204 of the reference write unit REF_WR_UNIT.

Since the parity for the sum of the first data DATA_1 and the second data DATA_2 is a valid parity, the memory controller 120 may set the parity write flag PARITY_WR_FLG, e.g., indicated by a V mark 1206.

In addition, since the parity for the sum of the first data DATA_1 and the second data DATA_2 is the most recently written parity, the memory controller 120 may update the value of the parity location pointer PARITY_LOC_PTR to a location 1208 where the parity for the sum of the first data DATA_1 and the second data DATA_2 is written.

Figure 13:
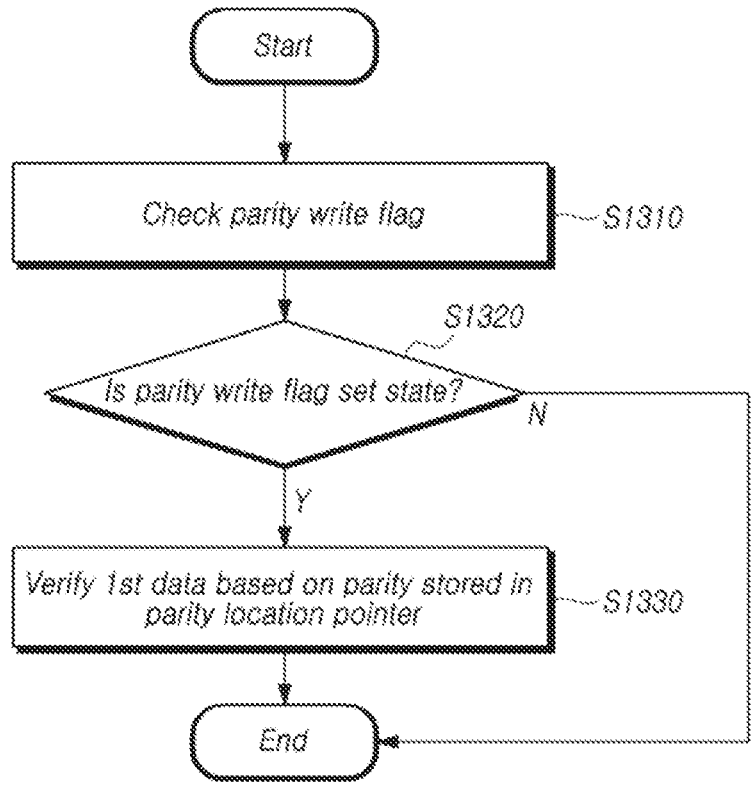
FIG. 13 is a flowchart illustrating an example of an operation performed by a memory system upon power-on reset according to embodiments of the present disclosure.

FIG. 13 is a flowchart illustrating an example of an operation performed by the memory system 100 upon power-on reset according to embodiments of the present disclosure.

Referring to FIG. 13, the memory controller 120 of the memory system 100 may check the parity write flag PARITY_WR_FLG upon the power on reset (POR) (S1310).

The memory controller 120 may determine whether the parity write flag PARITY_WR_FLG is set (S1320). In this case, the state in which the parity write flag PARITY_WR_FLG is set may mean that data having a size smaller than the size of the reference write unit REF_WR_UNIT is written to the memory device 110, so the memory controller 120 is required to verify whether an error has occurred in the data.

In the event where the parity write flag PARITY_WR_FLG is set (S1320-Y), the memory controller 120 may verify the first data DATA_1 written to the memory device 110 based on the first parity PARITY_1 written to the location indicated by the parity location pointer PARITY_LOC_PTR (S1330). In this case, the memory controller 120 may calculate the parity based on the first data DATA_1 written to the memory device 110 and verify the first data DATA_1 by determining whether the calculated parity is the same as the first parity PARITY_1 and the operation may be terminated (End). In the event where the parity write flag PARITY_WR_FLG is not set (S1320—N), no action is performed by the memory controller 120 (End).

Meanwhile, the memory controller 120 may search for the first data DATA_1 in an open memory block among the plurality of memory blocks BLK disposed in the memory device 110. This is because, after the first data DATA_1 having a size smaller than the size of the reference write unit REF_WR_UNIT has been written to the open memory block of the memory device 110, the power-on reset is executed before the memory block to which the first data DATA_1 is written has been closed.

Figure 14:
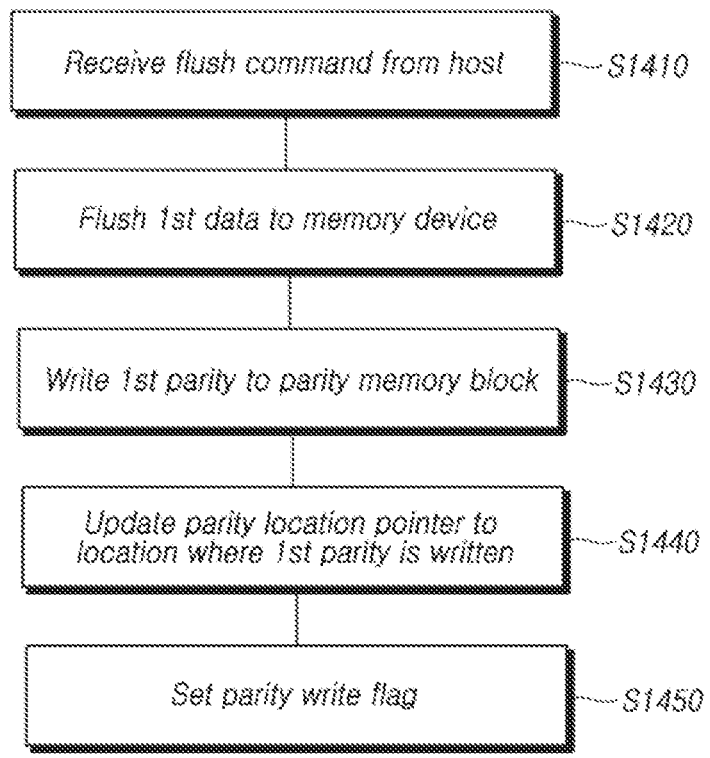
FIG. 14 is a diagram illustrating a method of operating a memory system according to embodiments of the present disclosure.

FIG. 14 is a flowchart illustrating a method of operating the memory system 100 according to exemplary embodiments of the present disclosure.

Referring to FIG. 14, the method of operating the memory system 100 may include receiving a flush command FLUSH_CMD from a host instructing the memory system 100 to flush the data cached in a data cache DATA_CACHE to the memory device 110 (S1410). Referring to FIG. 4, the memory system 100 receives a flush command FLUSH_CMD from a host.

In addition, the operating method of operating the memory system 100 may include flushing first data DATA_1 to the memory device 110 (S1420). In this case, the first data DATA_1 is in a state cached in the data cache DATA_CACHE for caching data to be written to the memory device 110, and has a size that is smaller than a size of a reference write unit REF_WR_UNIT, which is the reference for writing data to the memory device 110 together with a parity.

Further, the method of operating the memory system 100 may include writing the first parity PARITY_1, which is the parity associated the first data DATA_1, to the parity memory block PARITY_BLK (S1430). The parity memory block PARITY_BLK is the memory block for storing parities for data blocks each having a size smaller than the size of the reference write unit REF_WR_UNIT among the plurality of memory blocks BLK included in the memory device 110. Referring to FIG. 12, PARITY_1 associated with first data DATA_1 is stored at the location 1205 of the parity memory block PARITY_BLK, and parity for (DATA_1+DATA_2) is stored at the location 1208 of the parity memory block PARITY_BLK.

In addition, the method operating of the memory system 100 may include updating the value of the parity location pointer PARITY_LOC_PTR indicating the location of the parity most recently written to the memory device 110 among parities for data blocks having a size smaller than the size of the reference write unit REF_WR_UNIT to the location where the first parity PARITY_1 is written (S1440).

The operating method of the memory system 100 may include setting the parity write flag PARITY_WR_FLG, which is the flag indicating whether the parity indicated by the parity location pointer PARITY_LOC_PTR is valid (S1450).

In this case, the parity write flag PARITY_WR_FLG and the parity location pointer PARITY_LOC_PTR may be included in metadata for managing data stored in the memory device 110.

The method of operating the memory system 100 may further include writing the second data DATA_2, which is data to be written immediately after the first data DATA_1, successively to the location where the first data DATA_1 is written in the memory device 110.

The operating method of the memory system 100 may further include writing the parity for the sum of the first data DATA_1 and the second data DATA_2 to the memory device 110.

In this case, for example, when the sum of the size of the first data DATA_1 and the size of the second data DATA_2 is equal to the size of the reference write unit REF_WR_UNIT, the parity write flag PARITY_WR_FLG may be reset. The parity for the sum of the first data DATA_1 and the second data DATA_2 may be written successively to the second data DATA_2. Referring to FIG. 11, the parity 1109 associated with DATA_1 and DATA_2 is written successively or sequentially to the second data DATA_2.

In another exemplary embodiment, in the case that the sum of the size of the first data DATA_1 and the size of the second data DATA_2 is smaller than the size of the reference write unit REF_WR_UNIT, the parity write flag PARITY_WR_FLG may be set, and the parity for the sum of the first data DATA_1 and the second data DATA_2 may be written to the parity memory block PARITY_BLK, and the value of the parity location pointer PARITY_LOC_PTR may be updated to the location where the parity for the sum of the first data DATA_1 and the second data DATA_2 is written. Referring to FIG. 12, the value of the parity location pointer PARITY_LOC_PTR may be updated to the location 1208 where the parity for the sum of the first data DATA_1 and the second data DATA_2 is written.

The method of operating the memory system 100 may further include checking the parity write flag PARITY_WR_FLG at the time of power-on reset, and verifying, in the state that the parity write flag PARITY_WR_FLG is set, the first data DATA_1 written to the memory device 110 based on the first parity PARITY_1 written in the location indicated by the parity location pointer PARITY_LOC_PTR.

In some implementations, the operation of the memory controller 120 described above may be controlled by the control circuit 123, and may be performed in such a manner that the processor 124 executes (drives) firmware or program instructions in the working memory 125 in which the overall operation of the memory controller 120 is programmed.

Figure 15:
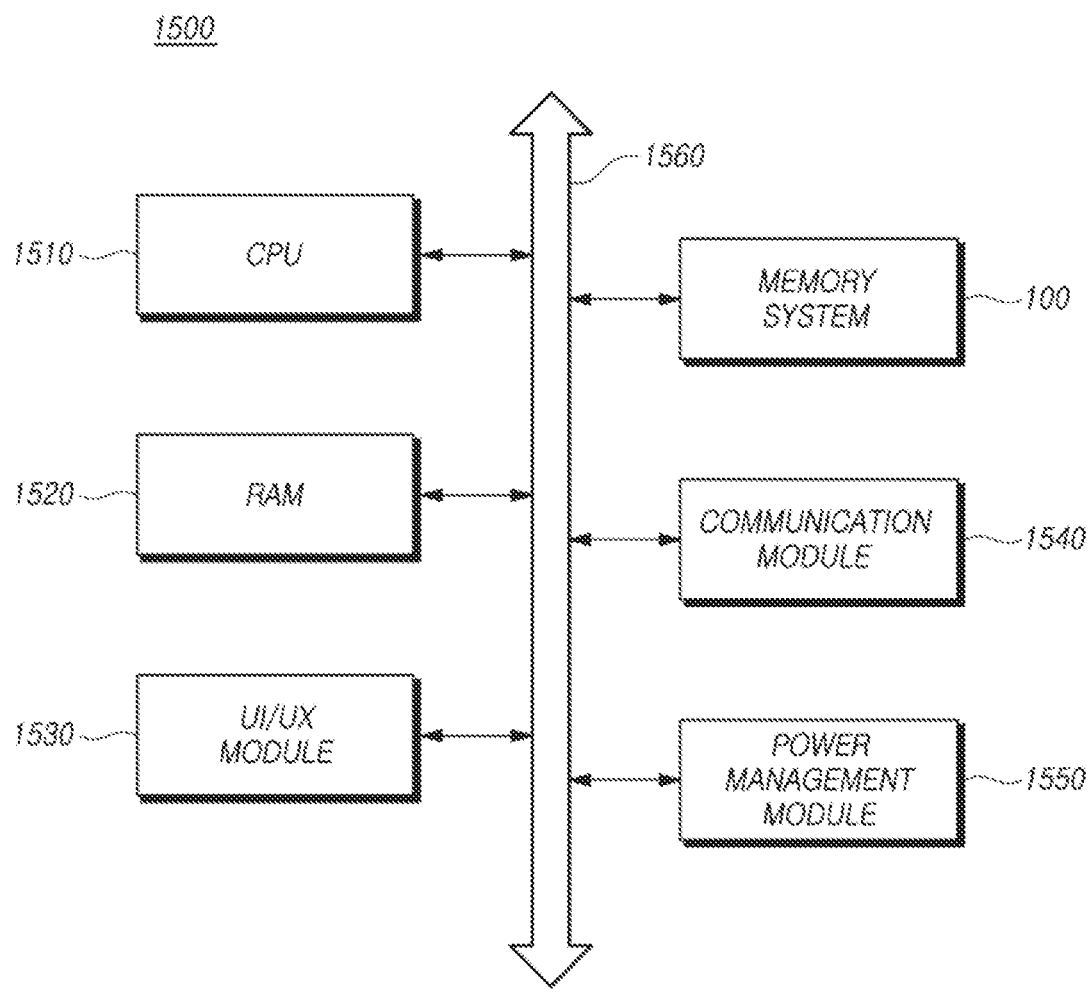
FIG. 15 is a diagram illustrating the configuration of a computing system based on some embodiments of the disclosed technology.

FIG. 15 is a diagram illustrating the configuration of a computing system 1500 according to an embodiment of the disclosed technology.

Referring to FIG. 15, the computing system 1500 according to an embodiment of the disclosed technology may include: a memory system 100 electrically connected to a system bus 1560; a CPU 1510 configured to control the overall operation of the computing system 1500; a RAM 1520 configured to store data and information associated with operations of the computing system 1500; a user interface/user experience (UI/UX) module 1530 configured to provide the user with a user environment; a communication module 1540 configured to communicate with an external device as a wired and/or wireless type; and a power management module 1550 configured to manage power used by the computing system 1500.

The computing system 1500 may be a personal computer (PC) or may be any one or more of a mobile terminal such as a smartphone, a tablet or various electronic devices.

The computing system 1500 may further include a battery for supplying an operating voltage, and may further include an application chipset, a graphic-related module, a camera image processor, and a DRAM. Other elements would be obvious to a person skilled in the art.

The memory system 100 may include not only a device configured to store data in a magnetic disk such as a hard disk drive (HDD), but may also include a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

Based on embodiments of the disclosed technology described above, the operation delay time of the memory system may be advantageously reduced or minimized. In addition, based on an embodiment of the disclosed technology, an overhead occurring in the process of calling a specific function may be advantageously reduced or minimized. Although various embodiments of the disclosed technology have been described with particular specifics and varying details for illustrative purposes, those skilled in the art will appreciate that various modifications, additions and substitutions may be made based on what is disclosed or illustrated in this disclosure.

What is claimed is:

1. A memory system comprising:
   a memory device including a plurality of memory blocks; and
   a memory controller for communicating with the memory device and controlling the memory device;
   wherein the memory controller is configured to, when receiving a flush command from a host instructing the memory device to flush data cached in a data cache to the memory device:
   flush first data cached in the data cache to the memory device, the first data having a size smaller than a size of a reference write unit which is a reference for writing data to the memory device together with a parity, and
   write a first parity associated with the first data to a parity memory block configured to store parities for data blocks each having a size smaller than the size of the reference write unit among the plurality of memory blocks.

2. The memory system of claim 1, wherein the memory controller is configured to:
   update a value of a parity location pointer indicating a location of a parity most recently written to the memory device among the parities for the data blocks to a location where the first parity is written; and
   set a parity write flag indicating whether the first parity at the location indicated by the parity location pointer is valid.

3. The memory system of claim 1, wherein the memory controller is configured to write second data to be written immediately after the first data successively to a location where the first data is written in the memory device.

4. The memory system of claim 3, wherein the memory controller is configured to write a parity for a sum of the first data and the second data to the memory device.

5. The memory system of claim 4, wherein, when the size of the sum of the first data and the size of the second data is the size of the reference write unit, the memory controller is configured to reset a parity write flag and write the parity for the sum of the first data and the second data successively to the second data.

6. The memory system of claim 4, wherein, when the size of the sum of the first data and the size of the second data is smaller than the size of the reference write unit, the memory controller is configured to set a parity write flag, write the parity for the sum of the first data and the second data to the parity memory block, and update the value of the parity location pointer to a location where the parity for the sum of the first data and the second data is written.

7. The memory system of claim 1, wherein the memory controller is configured to check a parity write flag upon power-on reset, and verify, in the event that the parity write flag is set, the first data written to the memory device based on the first parity written to the location indicated by the parity location pointer.

8. A method of operating a memory system including a memory device having a plurality of memory blocks, the method comprising:
   receiving, by a memory controller, a flush command from a host instructing the memory device to flush data cached in a data cache to the memory device,
   flushing first data cached in the data cache to the memory device, the first data having a size smaller than a size of a reference write unit which is a reference for writing data to the memory device together with a parity, and
   writing a first parity associated with the first data to a parity memory block configured to store parities for data blocks each having a size smaller than a size of the reference write unit among the plurality of memory blocks.

9. The method of claim 8, further comprising:
   updating a value of a parity location pointer indicating a location of a parity most recently written to the memory device among the parities for the data blocks to a location where the first parity is written; and
   setting a parity write flag indicating whether the first parity at the location indicated by the parity location pointer is valid.

10. The method of claim 8, further comprising writing second data to be written immediately after the first data successively to a location where the first data is written in the memory device.

11. The method of claim 10, further comprising writing a parity for a sum of the first data and the second data to the memory device.

12. The method of claim 11, further comprising, when a size of the sum of the first data and the size of the second data is equal to a size of the reference write unit:
   resetting the parity write flag; and
   writing the parity for the sum of the first data and the second data successively to the second data.

13. The method of claim 11, further comprising, when a size of the sum of the first data and the size of the second data is smaller than the size of the reference write unit:
- setting the parity write flag by the memory controller;
- writing the parity for the sum of the first data and the second data to the parity memory block; and
- updating the value of the parity location pointer to a location where the parity for the sum of the first data and the second data is written.

14. The method of claim 8, further comprising:
- checking the parity write flag upon power-on reset; and
- verifying, in the event that the parity write flag is set, the first data written to the memory device based on the first parity written to the location indicated by the parity location pointer.

15. A memory system comprising:
- a memory device including a plurality of memory blocks; and
- a memory controller for communicating with the memory device and controlling the memory device,
- wherein the memory controller is configured to:
- receive a flush command from a host instructing the memory device to flush data cached in a data cache to the memory device;
- write first data cached in the data cache to a location of the memory device;
- write second data successively to the location where the first data has been written;
- calculate a first parity associated with the first data;
- determine a value of a parity location pointer indicating a location where the first parity has been written; and
- set a parity write flag.

16. The memory system of claim 15, wherein the memory controller is further configured to:
- determine a size of a sum of the first data and the second data is equal to a size of a reference write unit; and
- in the event that the size of the sum of the first data and the second data is equal to the size of a reference write unit:
- reset the parity write flag;
- calculate a parity associated with the sum of the first data and the second data; and
- write the calculated parity successively to the second data.

17. The memory system of claim 15, wherein the memory controller is further configured to:
- determine a size of a sum of the first data and the second data is equal to a size of a reference write unit; and
- in the event that the size of the sum of the first data and the second data is smaller than the size of a reference write unit:
- calculate a sum parity associated with the sum of the first data and the second data; and
- write the calculated sum parity to a parity memory block in the memory device.

18. The memory system of claim 17, wherein the memory controller is further configured to:
- update a value of a second parity location pointer corresponding to a location to which the calculated sum parity has been written.

19. The memory system of claim 15, wherein the parity write flag is disposed in the memory device.

20. The memory system of claim 15, wherein the parity write flag is disposed external to the memory device.

* * * * *